United States Patent [19]

McGovern

[11] Patent Number: 4,844,044

[45] Date of Patent: Jul. 4, 1989

[54] TORSION DAMPING MECHANISM FOR A SUPERCHARGER

[75] Inventor: Kevin M. McGovern, Dearborn Heights, Mich.

[73] Assignee: Eaton Corporation, Cleveland, Ohio

[21] Appl. No.: 211,944

[22] Filed: Jun. 27, 1988

[51] Int. Cl.⁴ .......................... F02B 33/38; F16D 3/12
[52] U.S. Cl. .................... 123/559.1; 418/206; 464/57; 464/66; 464/77
[58] Field of Search ............ 123/559.1; 418/69, 182, 418/201, 206; 464/57, 77, 66, 67, 160

[56] References Cited

U.S. PATENT DOCUMENTS

| | | | |
|---|---|---|---|
| 1,185,671 | 6/1916 | Hooker | 464/67 X |
| 1,331,090 | 2/1920 | Bijur | 464/57 X |
| 1,431,401 | 10/1922 | Hupp | 464/57 |
| 1,449,817 | 3/1923 | Hart | 464/66 |
| 1,705,984 | 3/1929 | Lindsay | 464/57 |
| 2,115,819 | 5/1938 | Lewis | 464/66 X |
| 2,963,006 | 12/1960 | Karde | 123/559.1 X |
| 2,989,857 | 6/1961 | Helland et al. | |
| 3,195,324 | 7/1965 | Sellwood et al. | |
| 3,236,066 | 2/1966 | Fredrickson | 464/77 |
| 4,171,627 | 10/1979 | Fukuda | |
| 4,564,345 | 1/1986 | Mueller | 418/206 |
| 4,638,570 | 1/1987 | Soeters | 33/562 |

FOREIGN PATENT DOCUMENTS

| | | | |
|---|---|---|---|
| 864045 | 1/1941 | France | 123/559.1 |
| 556209 | 9/1943 | United Kingdom | 60/624 |

Primary Examiner—Michael Koczo
Attorney, Agent, or Firm—P. S. Rulon

[57] ABSTRACT

An intake manifold (18) for an engine (10) includes a Roots-type supercharger (26) having a torsion damping mechanism (54) for reducing audible rattle of timing gears (72,74) which prevents contact of meshed lobes (28a,29a) of the supercharger rotors (28,29). The damping mechanism includes torsion springs (98,100) preloaded against each other. Torsion spring (98) has a low spring rate for attenuating torque fluctions or spikes during non-supercharging, low engine speed modes of operation. Spring (100) has a relatively high spring rate and functions as a shock absorber during engine shut down and during rough engine operation.

24 Claims, 3 Drawing Sheets

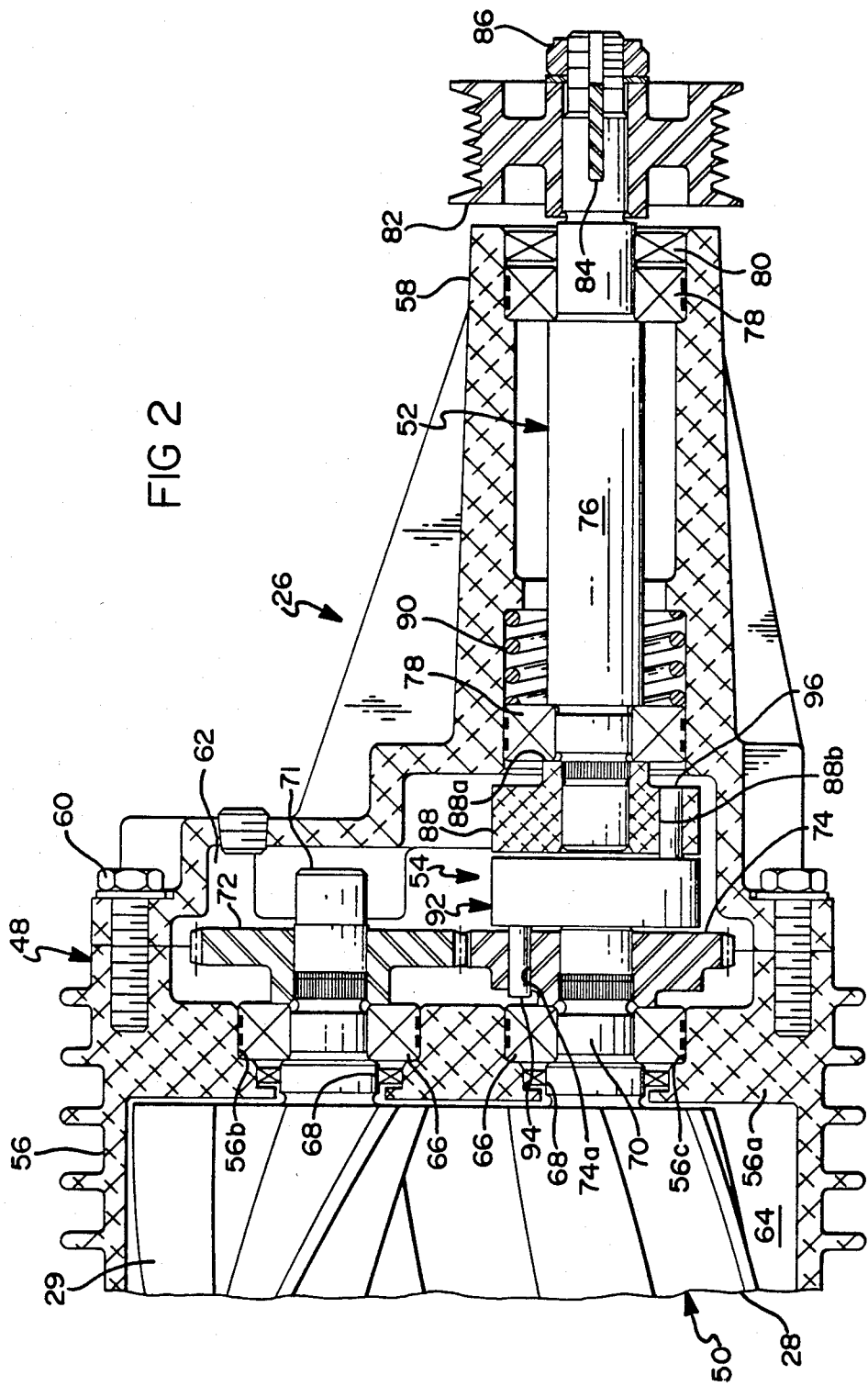

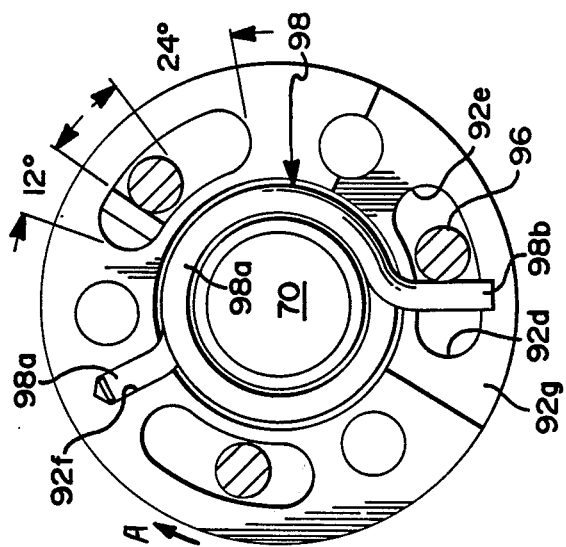
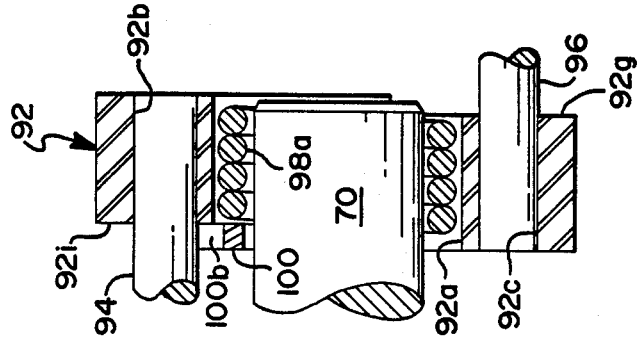
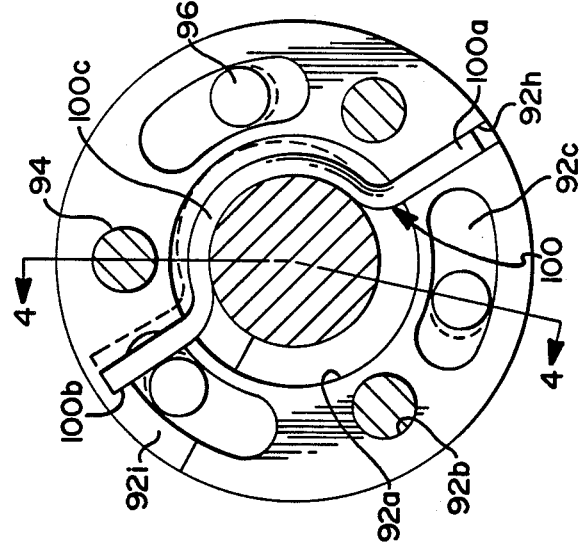
FIG 5
FIG 4
FIG 3 ated to U.S. application Ser.
TORSION DAMPING MECHANISM FOR A SUPERCHARGER

CROSS REFERENCE TO RELATED APPLICATION

This application is related to U.S. application Ser. No. 200,330, filed May 31, 1988 and assigned to the assignee of this application. Application Ser. No. 200,330 is incorporated herein by reference.

FIELD OF THE INVENTION

This invention relates to a torsion damping mechanism. More specifically, the invention relates to a torsion damping mechanism for reducing audible noise of timing gears in a backflow-type supercharger driven by an internal combustion engine.

BACKGROUND OF THE INVENTION

Rotary blowers of the backflow-type, particularly Roots-type blowers are characterized by noisy operation. Roots-type blower noise may be roughly classified into two groups: solid borne noise caused by rotation of timing gears and rotor shaft bearings subjected to fluctuating loads, and fluid borne noise caused by fluid flow characteristics such as rapid changes in fluid velocity. The invention of this application is concerned with solid borne noise caused by timing gear rattle.

The timing gears of the Roots-type blowers, such as the blower disclosed in U.S. Pat. No. 4,638,570, are known to produce an objectionable gear rattle when the meshed teeth of the gears are substantially unloaded. Such an unloaded condition occurs during non-supercharging, low engine speed operation.

SUMMARY OF THE INVENTION

An object of this invention is to negate objectional rattle noise produced by the timing gears in a backflow-type supercharger.

Another object of this invention is to provide a torsion damping mechanism which reduces timing gear rattle in a Roots-type blower driven by a periodic combustion engine and which damper prevents objectionable secondary noise during periods when the engine is being shut down or operating roughly at low speeds.

According to a feature of the invention a rotary blower of the backflow-type, such as disclosed in U.S. Pat. No. 4,638,570, comprises a housing; first and second meshed lobed rotors rotatably disposed in the housing for transferring relatively low pressure inlet port air to outlet port air controllable between relatively low and high pressures; first and second meshed timing gears respectively fixed to the first and second rotors for preventing contact of the meshed lobes; and an input drive adapted to be rotatably driven by a positive torque about an axis in one drive direction at speeds proportional to speeds of a periodic combustion, torque transmitting engine selectively controllable between idle and maximum speeds. The improvement comprises, a torsion damping mechanism for transmitting engine torque to the first timing gear. The damping mechanism includes drive means and first and second spring means. The drive means is driven by the input drive and is mounted for limited to-and-fro rotation relative to the first timing gear. The first spring means has opposite ends reacting between the drive means and the first timing gear and resiliently transmits torque in positive direction. The second spring means has opposite ends reacting being the drive means and the first timing gear and resiliently absorbs torque in a negative drive direction. And the second spring means has a spring rate greater than the spring rate of the first spring means.

BRIEF DESCRIPTION OF THE DRAWINGS

The supercharger and torsion damping mechanism of the present invention is shown in the accompanying drawings in which:

FIG. 2 is a partial, sectional view of the supercharger; and

FIGS. 3-5 are detailed views of a torsion damping mechanism in FIG. 2.

DETAILED DESCRIPTION OF THE DRAWINGS

Figure 1:
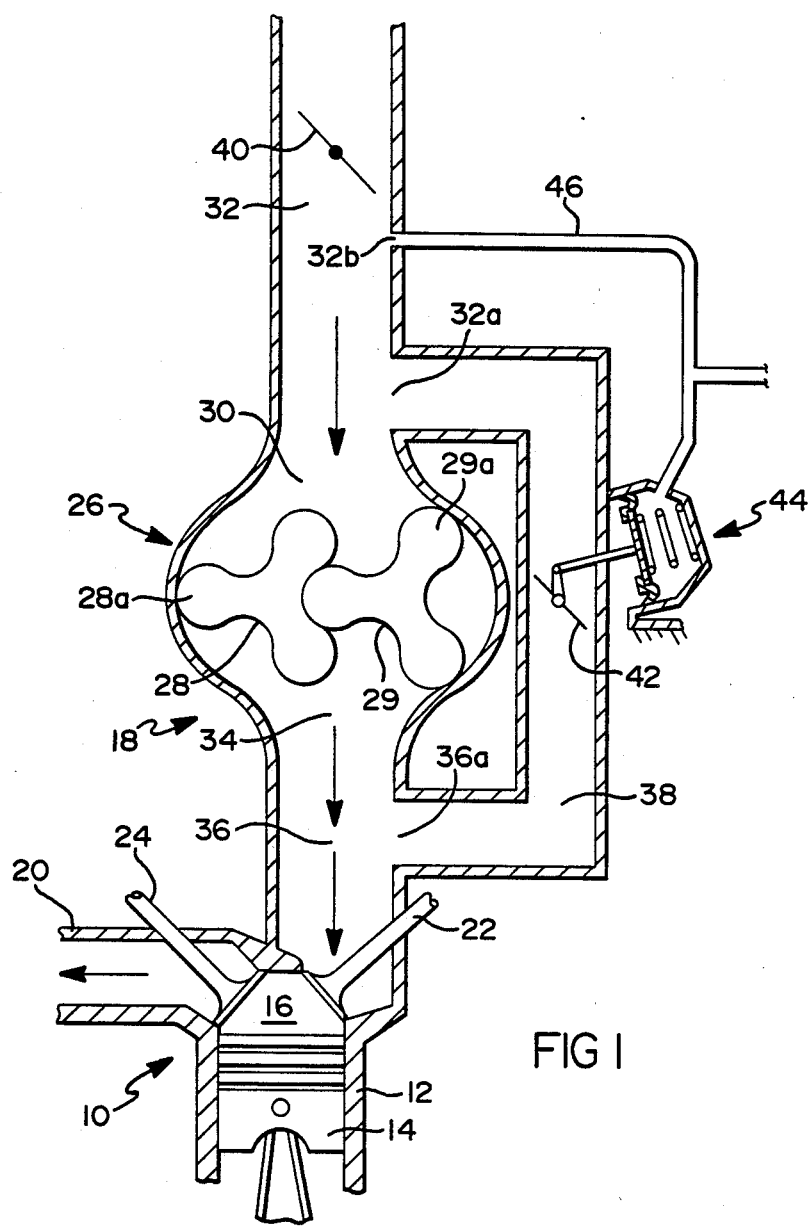
FIG. 1 schematically illustrates an intake manifold assembly having a positive displacement, backflow-type blower or supercharger therein for boosting pressure to an internal combustion engine.

Referring first to FIG. 1, therein is schematically illustrated a portion of an internal combustion engine 10 which is preferably of the periodic combustion type such as the Otto or Diesel cycle type. The engine includes a plurality of cylinders 12 and a reciprocating piston 14 disposed within each cylinder to define an expandable combustion chamber 16, the engine includes intake and exhaust manifold assemblies 18,20 for respectively directing combustion air to-and-from the combustion chambers via intake and exhaust valves 22,24.

The intake manifold assembly 18 includes a positive displacement blower 26 of the backflow or Roots-type having a pair of rotors 28,29 with meshed lobes 28a,29a. The rotors may be mechanically driven by engine crankshaft torque transmitted thereto in known manner via an unshown drive belt. The mechanical drive rotates the blower rotors at a fixed ratio relative to crankshaft speed and such that the blower displacement is greater than the engine displacement, thereby boosting or supercharging the air going to the engine combustion chambers to increase engine power.

The supercharger includes an inlet port 30 receiving an air or air-fuel mixture charge from an inlet duct or passage 32 and a discharge or outlet port 34 directing the charge to the intake valves 22 via a discharge duct or passage 36. The intake and discharge ducts are intercommunicated via a bypass duct or passage 38 connected at openings 32a,36a in the intake and discharge ducts 32,36, respectively. If the engine 10 is of the Otto cycle type, a throttle valve 40 preferably controls air or air-fuel mixture flow into intake duct 32 from a source, such as ambient or atmospheric air, in a well known manner.

Disposed within the bypass duct is a bypass valve 42 which is moved between open and closed positions by an actuator assembly 44 responsive to pressure in inlet duct 32 via a line 46 and therefore operative to control supercharging pressure in duct 36 as a function of engine power demand. When bypass valve 42 is in the fully open position, the air pressure in discharge duct 36 is relatively low or a minimum relative to the air pressure in intake duct 32. When the valve is fully closed, the air in the discharge duct is relatively high.

Looking now at FIGS. 2-5, therein is shown a portion of blower 26 in detail. The shown portion includes a housing assembly 48, a rotor assembly 50, an input drive assembly 52, and a torsion damping mechanism 54. Damper mechanism 54 is shown in relief in FIGS. 2, 3, and 5 and in section in FIG. 4. The section of FIG. 4 is taken along line 4—4 of FIG. 3. The housing assembly includes a main housing section 56 and an input drive section 58 secured together by a plurality of bolts 60 and defining therebetween a gear chamber 62 which normally contains a lubricating oil. The main housing section 56 defines a rotor chamber 64 separated from the gear chamber by an end wall portion 56a having stepped through bores 56b,56c for supporting anti-friction bearings 66 and dynamic seals 68. Main housing section 56 also defines inlet and outlet ports 30,34 and a second unshown end wall portion for closing the left end of chamber 64 and supporting bearings similar to bearings 66.

The rotor assembly 50 includes the rotors 28,29, shafts 70,71 fixed to the rotors and supported at both ends by bearings such as bearing 66, and meshed timing gears 72,74 pressed on the right ends of shafts 70,71 and operative to prevent contact of meshing rotor lobes 28a,29a. Rotors 28,29, like housing assembly 48, are preferably formed of a light-weight material, such as aluminum alloy. The rotors may include any number of lobes; herein each rotor includes three lobes 28a,29a. The lobes may be straight, as shown in FIG. 1, or helical, as shown in FIG. 2. A more detailed description of the main housing section and rotor assembly may be found in U.S. Pat. No. 4,638,570 which is incorporated herein by reference.

Input drive assembly 52 includes a shaft 76 supported by anti-friction bearings 78 and axially aligned with the axis of shaft 70, a dynamic seal 80, a pulley 82 secured to shaft 76 by a key 84 and a nut 86, an annular end member 88 pressed on the left end of the shaft, and a spring 90 leftwardly biasing the leftwardly disposed bearing 78 against a shoulder 88c of end member 88 to prevent bearing flutter. Pulley 82 is driven by the previously mentioned and unshown belt which transmits engine torque.

During non-supercharging, low engine speed or idle speed operation the meshed teeth of the timing gears are substantially unloaded and have been known to bounce or clash back and forth against each other through the backlash therebetween. The bounce or clash produces an objectional noise known as gear rattle and is believed to be caused by torsionals in the supercharger drive torque provided by periodic combustion engines such as engine 10. The resilient drive provided by torsion damping assembly 54 reduces the rattle noise below the audible range.

Torsion damping mechanism 54 includes an annular member 92, two sets of three axially extending pins or drive and driven means 94,96, and two torsion springs 98,100. Annular member 92 is disposed for rotation about the common axis of shafts 70,76 and includes a central opening having a surface 92a concentric to the common axis, three circumferentially spaced apart through bores 92b, and three circumferentially spaced apart through slots 92c of arcuate shape and interspaced between the through bores. Through bores 92b and slots 92c are radially spaced from and extend parallel to the common axis. Pins 94 are press fit at one end into bores 74a of gear 74 and are press fit at the other end into through bores 92a of the annular member. Pins 96 are press fit at one end into bores 88b of end member 88 and are slidably received at the other en by arcuate slots 92c. Pins 96 and slots 92c may be provided with an amount of radial free play therebetween to mitigate the effects of misalignment of shafts 70,76 and/or the components therebetween. The ends of slots 92c define positive stops 92d,92e which limit relative rotation between the input drive 52 and timing gear 74. Spring 98 provides a low rate resilient drive between pins 94,96 which attenuates or isolates torque fluctuations or torque spikes for preventing audible gear tooth rattle of timing gears 72,74 during non-supercharging, low engine speed modes of operation. Spring 100 provides a relatively high rate resilient shock absorber for preventing audible impacts of pins 96 against stops 92e due to negative torque fluctuations or spikes which often occur during engine shut down and which may occur during rough engine operation.

Torsion spring 98 includes radially extending, opposite ends or tangs 98a,98b interconnected by a plurality of helically wound coils (herein about 3.5 coils) disposed in central opening 92a of the annular member. End 98a is retained against movement relative to annular member 92 and timing gear 74 in a blind bore 92f. End 98b is disposed for circumferential movement in an axially open, arcuate recess 92g in an end face of annular member 92 and is positioned against one of pins 96 to resiliently transmit torque in the direction of arrow A in FIG. 5 from means or pin 96 to gear 74 via annular member 92 and driven means or pins 94. Herein, torque in the direction of arrow A is taken as positive and in the opposite direction as negative.

Torsion spring 100 includes radially extending, opposite ends or tangs 100a,100b interconnected by a half coil or C-shaped portion 100c disposed in central opening 92a of the annular member. End 100a is retained against movement relative to annular member 92 and timing gear 74 in a radially extending slot 92h. End 100b is disposed for circumferential movement in an axially open, arcuate recess 92i in an end face of annular member 92 and is positioned against one of pins 96 to resiliently oppose or absorb negative torque or torque spikes to prevent high velocity, audible impacts of stops 92e by pins 96. Such impacts occur primarily during engine shut down and can occur during rough engine operation at relatively low speeds. Stops 92d,92e limit maximum relative rotation to 36 degrees and drive means or pins 96 are spaced from both stops by springs 98,100 during non-torque transmitting states of the damping mechanism, i.e., when the mechanism is not rotating.

As previously mentioned, the primary function of spring 98 is to prevent audible gear tooth rattle during non-supercharging, low engine speed modes of operation. During such modes of operation, spring 98 is ideally capable of torque transmission sufficient to drive the gears without contact of stops 92d by pins 96 and is preferably capable of doing so with minimium travel of the pins in slots 92c to thereby limit relative kinetic energy due to high velocity oscillations of the pins relative to the slots. In the disclosed damping mechanism, travel of pins 96 in slots 92c and flexing of spring 98 is reduced by preloading low rate spring 98 against relatively high rate spring 100. By way of example only, the rate of the springs differs by an order of magnitude or more. Herein, spring 98 has a rate of about ⅛ inch pounds per degree of movement of end 98b relative to end 98a and spring 100 has a rate of about five inch pounds per degree of initial travel of end 100b relative to end 100a. In the non-torque transmitting states, as shown in FIG. 5, spring 98 is preloaded 14 degrees.

Further, the spring rate of spring 100 may be increased over its initial rate by positioning a portion of the C-shaped portion 100c to contact surface 92a of annular member 92 in response to a predetermined flexing of the spring or negative torque exceeding a predetermined amount, as shown by phantom lines 100d in FIG. 3.

A preferred embodiment of the invention has been disclosed herein for illustrative purposes. Many variations and modifications of the disclosed embodiment are believed to be within the spirit of the invention. The following claims are intended to cover inventive portions of the disclosed embodiment and variations and modifications believed to be within the spirit of the inventive portions.

What is claimed is:

1. A rotary blower of the backflow-type comprising a housing; first and second meshed lobed rotors rotatably disposed in the housing for transferring relatively low pressure inlet port air to outlet port air controllable between relatively low and high pressures; first and second meshed timing gears respectively fixed to the first and second rotors for preventing contact of the meshed lobes; and an input drive adapted to be rotatably driven by a positive torque about an axis in one drive direction at speeds proportional to speeds of a periodic combustion, torque transmitting engine selectively controllable between idle and maximum speeds; the improvement comprising:

a torsion damping mechanism for transmitting engine torque to the first timing gear, said damping mechanism including drive means and first and second spring means, said drive means driven by the input drive and mounted for limited to-and-fro rotation relative to the first timing gear, said first spring means having opposite ends reacting between the drive means and the first timing gear and resiliently transmitting torque in the positive direction, and said second spring means having opposite ends reacting between the drive means and the first timing gear and resiliently absorbing torque in a negative drive direction, and said second spring means having a spring rate greater than the spring rate of the first spring means.

2. The blower of claim 1, wherein said first and second spring means are preloaded against said drive means in opposite directions when said damping mechanism is in a non-torque transmitting state.

3. The blower of claim 1, wherein said mechanism includes stop means operative to arrest said relative rotation in said one drive direction in response to the engine speed being increased a predetermined amount above engine idle.

4. The blower of claim 1, including, means for increasing the spring rate of said second spring means in response to negative torque exceeding a predetermined amount.

5. The blower of claim 1, wherein said damping mechanism includes a member having an inner surface defining a central opening concentric to said axis, the ends of said second spring means being interconnected by a C-shaped portion disposed in said central opening, said C-shaped portion spaced radially inward of said surface when said damping mechanism is in a non-torque transmitting state and operative to contact a portion of said surface to increase the spring rate of the second spring means in response to negative torque exceeding a predetermined amount.

6. The blower of claim 5, wherein said first spring means is a torsion spring having a plurality of helically wound coils disposed in said central opening.

7. The blower of claim 1, wherein said damping mechanism includes an annular member secured to said first timing gear and having at least two circumferentially spaced apart slots with ends defining stops, said drive means includes at least two pins each fixed at one end to the input drive and at the other end each loosely received by said by one of said slots, said first and second spring means being preloaded in opposite directions for spacing said pins from the ends of said slots when said damping mechanism is in a non-torque transmitting state.

8. The blower of claim 7, wherein the ends of said slots in the one drive direction contact said pins in response to the engine speed being increased by a predetermined amount above engine idle.

9. The blower of claim 8, including means for increasing the spring rate of said second spring means in response to negative torque exceeding a predetermined amount.

10. A rotary blower of the backflow-type comprising a housing; first and second meshed lobed rotors rotatably disposed in the housing for transferring relatively low pressure inlet port air to outlet port air controllable between relatively low and high pressures; first and second meshed timing gears respectively fixed to the first and second rotors for preventing contact of the meshed lobes; and an input drive adapted to be rotatably driven by a positive torque about an axis in one drive direction at speeds proportional to speeds of a periodic combustion, torque transmitting engine selectively controllable between idle and maximum speeds; the improvement comprising:

a torsion damping mechanism for transmitting engine torque to the first timing gear, said mechanism including drive and driven means and first and second spring means, said drive and driven means respectively secured for rotation with the input drive and the first timing gear and mounted for limited rotation relative to each other, said first spring means having opposite ends reacting between the drive and driven means in said one drive direction, said second spring means having opposite ends reacting between the drive and driven means in a direction opposite the one drive direction, and said second spring means having a spring rate greater than the spring rate of the first spring means.

11. The blower of claim 10, wherein said first and second spring means are preloaded against said drive means in opposite directions when said damping mechanism is in a non-torque transmitting state.

12. The blower of claim 10, wherein said mechanism includes stop means operative to arrest said relative rotation in said one drive direction in response to the engine speed being increased a predetermined amount above engine idle.

13. The blower of claim 10, including means for increasing the spring rate of said second spring means in response to negative torque exceeding a predetermined amount.

14. The blower of claim 10, wherein said damping mechanism includes a member having an inner surface defining a central opening concentric to said axis, the ends of said second spring means being interconnected by a C-shaped portion disposed in said central opening, said C-shaped portion spaced radially inward of said surface when said damping mechanism is in a non-torque transmitting state and operative to contact a portion of said surface to increase the spring rate of the second spring means in response to negative torque exceeding a predetermined amount.

15. The blower of claim 14, wherein said first spring means is a torsion spring having a plurality of helically wound coils disposed in said central opening.

16. The blower of claim 10, wherein said damping mechanism includes a member fixed for rotation with one of either said drive and driven means, said member having an inner surface defining a central opening concentric to said axis, positive stop means for limiting said relative rotation in at least said one drive direction, and said first spring means being a torsion spring having a plurality of helically wound coils disposed in said central opening and interconnecting its opposite ends.

17. The blower of claim 16, wherein said second spring means includes a C-shaped portion disposed in said central opening and interconnecting its ends.

18. The blower of claim 17, wherein said C-shaped portion is spaced radially inward of the surface of the central opening when said damping mechanism is in a non-torque transmitting state and wherein a portion of said C-shaped portion moves into contact with a portion of said surface in response to negative torques.

19. The blower of claim 18, wherein said stop means arrests said relative rotation in said one drive direction in response to the engine speed being increased a predetermined amount above engine idle.

20. A torsion damping mechanism for reducing audible noise of at least first and second continuous mesh gears operating at low loading and rotatably driven by torque in one direction from a periodic combustion engine operating in a speed range near engine idle; said mechanism comprising:
 drive and driven means driven in said one direction, mounted for limited relative rotation, respectively driven by the engine and driving the first gear;
 first spring means having opposite ends reacting between the drive and driven means for transmitting torque in said one drive direction for attenuating torsionals, said first spring means having a low torque transmitting capacity relative to full torque transmitting capacity of said gears and having relatively low spring rate for reducing gear tooth rattle of said gears;
 first stop means for contacting a portion of the drive means and arresting said relative rotation in said one drive direction in response to the engine speed being increased a predetermined amount above engine idle and for limiting stored energy in the first spring means;
 second stop means for contacting another portion of the drive means and arresting said relative rotation in a direction opposite said one drive direction, said second spring means having a spring rate greater than the spring rate of the first spring means;
 second spring means having opposite ends reacting between the drive and driven means for absorbing torque in said opposite drive direction, said second spring means being sized to normally prevent engagement of the second stop means.

21. The damping mechanism of claim 20, wherein said first and second spring means are preloaded for positioning the drive means portion between said first and second stop means when said damping mechanism is in a non-torque transmitting state.

22. The damping mechanism of claim 20, includes means for increasing the spring rate of said second spring means in response to torque in said opposite direction exceeding a predetermined amount.

23. A torsion damping mechanism for reducing audible noise of at least first and second continuous mesh gears operating at low loading and rotatably driven by torque in one direction from a periodic combustion engine operating in a speed range near engine idle; said mechanism comprising:
 drive and driven means driven in said one direction, mounted for limited relative rotation, respectively driven by the engine and driving the first gear;
 first spring means having opposite ends reacting between the drive and driven means for transmitting torque in said one drive direction for attenuating torsionals;
 first stop means for contacting a portion of the drive means and arresting said relative rotation in said one drive direction in response to the engine speed being increased a predetermined amount above engine idle and for limiting stored energy in the first spring means;
 second stop means for contacting another portion of the drive means and arresting said relative rotation in a direction opposite said one drive direction;
 second spring means having opposite ends reacting between the drive and driven means for absorbing torque in said opposite drive direction, said second spring means being sized to normally prevent engagement of the second stop means; and
 means for increasing the spring rate of said second spring means in response to torque in said opposite direction exceeding a predetermined amount.

24. The damping mechanism of claim 23, wherein said first and second spring means are preloaded for positioning the drive means portion between said first and second stop means when said damping mechanism is in a non-torque transmitting state.

* * * * *